(12) United States Patent
Govindan et al.

(10) Patent No.: US 11,182,166 B2
(45) Date of Patent: Nov. 23, 2021

(54) BRANCH PREDICTION THROUGHPUT BY SKIPPING OVER CACHELINES WITHOUT BRANCHES

(71) Applicant: Samsung Electronics Co., Ltd., Suwon-si (KR)

(72) Inventors: Madhu Saravana Sibi Govindan, Austin, TX (US); Fuzhou Zou, Austin, TX (US); Anhdung Ngo, Austin, TX (US); Wichaya Top Changwatchai, Austin, TX (US); Monika Tkaczyk, Austin, TX (US); Gerald David Zuraski, Jr., Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/561,004

(22) Filed: Sep. 4, 2019

(65) Prior Publication Data
US 2020/0371811 A1 Nov. 26, 2020

Related U.S. Application Data

(60) Provisional application No. 62/852,286, filed on May 23, 2019.

(51) Int. Cl.
*G06F 9/38* (2018.01)
*G06F 9/48* (2006.01)
*G06F 9/54* (2006.01)

(52) U.S. Cl.
CPC .......... *G06F 9/3842* (2013.01); *G06F 9/3806* (2013.01); *G06F 9/3816* (2013.01); *G06F 9/4881* (2013.01); *G06F 9/544* (2013.01)

(58) Field of Classification Search
CPC .... G06F 9/3842; G06F 9/4881; G06F 9/3806; G06F 9/3816; G06F 9/544; G06F 9/3804
See application file for complete search history.

(56) References Cited

U.S. PATENT DOCUMENTS

| 7,234,046 | B2 | 6/2007 | Su |
| 7,398,358 | B2 | 7/2008 | Dowling |
| 7,555,692 | B1 * | 6/2009 | Iacobovici ............ G06F 9/3001 708/233 |
| 7,765,387 | B2 * | 7/2010 | Sunayama .............. G06F 9/321 712/233 |
| 7,783,871 | B2 | 8/2010 | Combs et al. |

(Continued)

FOREIGN PATENT DOCUMENTS

CN 105718241 B 3/2018

*Primary Examiner* — Farley Abad
(74) *Attorney, Agent, or Firm* — Renaissance IP Law Group LLP (57) ABSTRACT

According to one general aspect, an apparatus may include a branch prediction circuit configured to predict if a branch instruction will be taken or not. The apparatus may include a branch target buffer circuit configured to store a memory segment empty flag that indicates whether or not the memory segment after a target address includes at least one other branch instruction, wherein the memory segment empty flag was created during a commit stage of a prior occurrence of the branch instruction. The branch prediction circuit may be configured to skip over the memory segment if the memory segment empty flag indicates a lack of other branch instruction(s).

20 Claims, 7 Drawing Sheets

(56) References Cited

U.S. PATENT DOCUMENTS

| | | |
|---|---|---|
| 9,361,110 B2 | 6/2016 | Lin |
| 10,203,959 B1* | 2/2019 | Feero ................. G06F 9/30047 |
| 2005/0278517 A1 | 12/2005 | Wong et al. |
| 2006/0095745 A1* | 5/2006 | Tran ..................... G06F 9/3824 |
| | | 712/238 |
| 2006/0224867 A1 | 10/2006 | Tran |
| 2006/0242391 A1* | 10/2006 | Elwood ................ G06F 9/3806 |
| | | 712/238 |
| 2008/0229068 A1 | 9/2008 | Bose et al. |
| 2012/0311308 A1* | 12/2012 | Xekalakis ........... G06F 9/30145 |
| | | 712/239 |
| 2013/0290640 A1* | 10/2013 | Aggarwal ................ G06F 1/32 |
| | | 711/125 |
| 2017/0068539 A1* | 3/2017 | Dundas ................ G06F 9/3806 |

\* cited by examiner

| 302 Branch Instruction | 304 Branch Target | 306 Empty Tag |
|---|---|---|
| 0xDEADBEEF | 0xD15EA5E | 1 |
| 0xB105F00D | 0xCAFEF00D | 0 |
| ... | ... | ... |
| 0xFEE1DEAD | 0x8BADF00D | 3 |

300

| 312 Return Address | 316 Empty Tag |
|---|---|
| 0xC00010FF | 1 |
| 0x000FF1CE | 0 |
| ... | ... |
| 0x0DEFACED | 3 |

BRANCH PREDICTION THROUGHPUT BY SKIPPING OVER CACHELINES WITHOUT BRANCHES

CROSS-REFERENCE TO RELATED APPLICATION

This application claims priority under 35 U.S.C. § 119 to Provisional Patent Application Ser. No. 62/852,286, entitled "IMPROVING BRANCH PREDICTION THROUGHPUT BY SKIPPING OVER CACHELINES WITHOUT BRANCHES" filed on May 23, 2019. The subject matter of this earlier filed application is hereby incorporated by reference.

TECHNICAL FIELD

This description relates to processor instruction flow, and more specifically to improving branch prediction throughput by skipping over cachelines without branches.

BACKGROUND

In computer architecture, a branch predictor or branch prediction unit is a digital circuit that attempts to guess which way a branch (e.g. an if-then-else structure, a jump instruction) will go before the result is actually computed and known. The purpose of the branch predictor is generally to improve the flow in the instruction pipeline. Branch predictors play a critical role in achieving high effective performance in many modern pipelined microprocessor architectures.

Two-way branching is usually implemented with a conditional jump instruction. A conditional jump can either be "not taken" and continue execution with the first piece of code which follows immediately after the conditional jump, or it can be "taken" and jump to a different place in program memory where the second piece of code is stored. It is often not known for certain whether a conditional jump will be taken or not taken until the condition has been calculated and the conditional jump has passed the execution stage in the instruction pipeline.

Without branch prediction, the processor typically would have to wait until the conditional jump instruction has passed the execute stage before the next instruction can enter the fetch stage in the pipeline. The branch predictor attempts to avoid this waste of time by trying to guess whether the conditional jump is most likely to be taken or not taken. Instructions at the destination of the branch that is guessed to be most likely taken are then fetched and speculatively executed. If the instruction execution stage detects that the guessed branch is wrong, the speculatively executed or partially executed instructions are often discarded and the pipeline starts over with the correct branch, incurring a delay.

SUMMARY

According to one general aspect, an apparatus may include a branch prediction circuit configured to predict if a branch instruction will be taken or not. The apparatus may include a branch target buffer circuit configured to store a memory segment empty flag that indicates whether or not the memory segment after a target address includes at least one other branch instruction, wherein the memory segment empty flag was created during a commit stage of a prior occurrence of the branch instruction. The branch prediction circuit may be configured to skip over the memory segment if the memory segment empty flag indicates a lack of other branch instruction(s).

According to another general aspect, an apparatus may include a branch detection circuit configured to detect, during a commit stage of a current instruction, an existence or at least one branch instruction stored within a portion of a memory segment. The apparatus may include a branch target buffer circuit configured to store: a branch instruction address, and a memory segment empty flag that indicates whether a portion of the memory segment after a target address includes at least one other branch instruction.

According to another general aspect, a system may include a branch detection circuit configured to detect, during a commit stage of a current committing instruction, an existence or at least one branch instruction stored with a portion of a memory segment. The system may include a branch target buffer circuit configured to store: a branch instruction address, and a memory segment empty flag that indicates whether a portion of the memory segment after a target address includes at least one other branch instruction. The system may include a branch prediction circuit configured to predict if a branch instruction will be taken or not, and wherein the branch prediction circuit is configured to skip over the memory segment if an associated memory segment empty flag indicates a lack of branch instructions.

The details of one or more implementations are set forth in the accompanying drawings and the description below. Other features will be apparent from the description and drawings, and from the claims.

A system and/or method for processor instruction flow, and more specifically to improving branch prediction throughput by skipping over cachelines without branches, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 1:
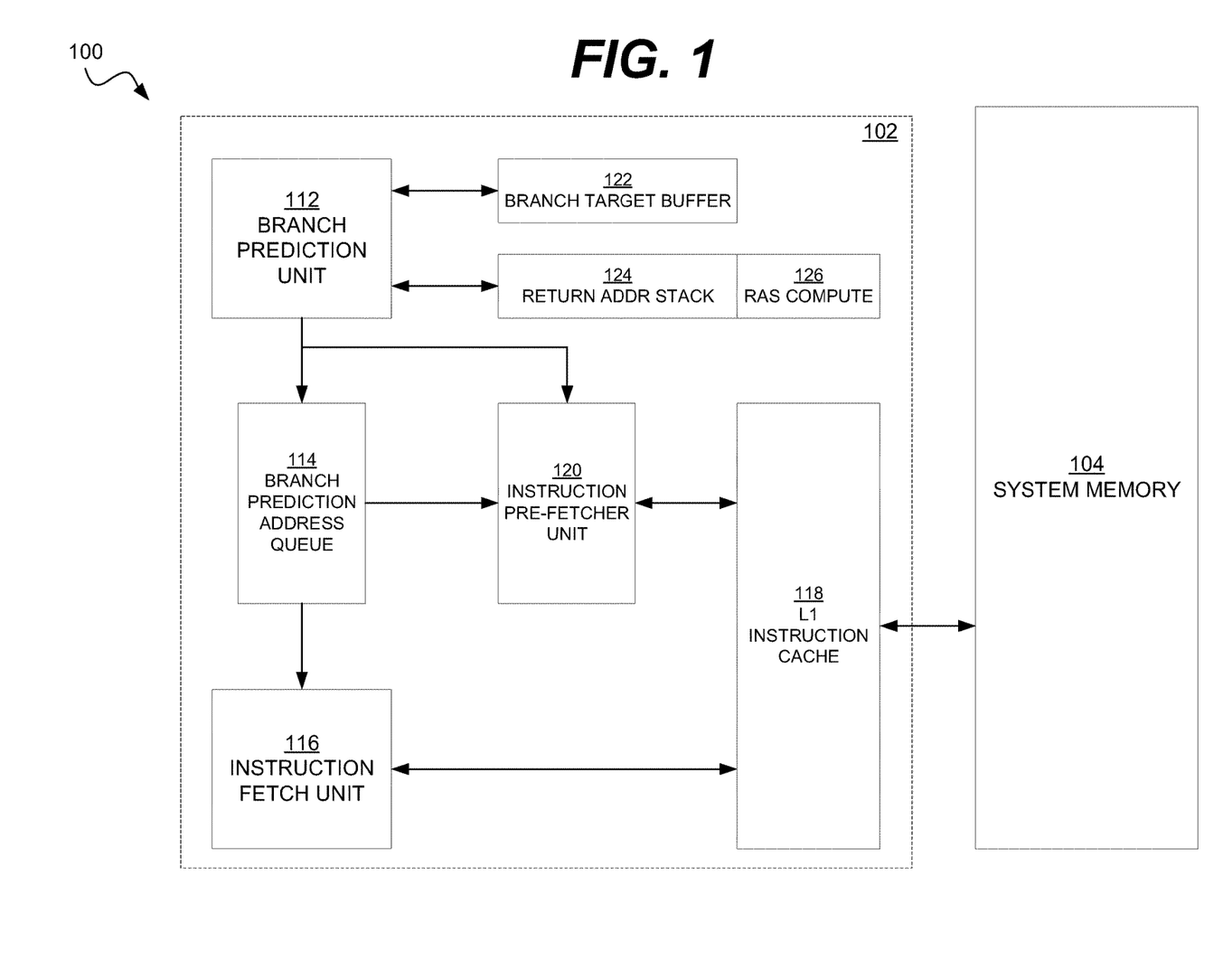
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a computer, a number of discrete integrated circuits, or a system-on-a-chip (SoC). As described below, the system 100 may include a number of other components that are not illustrated in this figure in order to not obscure the disclosed subject matter.

In the illustrated embodiment, the system 100 includes a system or main memory 104. In various embodiments, the system memory 104 may be made up of dynamic random access memory (DRAM). Although, it is understood that the above is merely one illustrative example to which the disclosed subject matter is not limited. In such an embodiment, the system memory 104 may include memory on modules (e.g., dual in-line memory modules (DIMMs)), may be integrated chips that are soldered or otherwise fixedly integrated with the system 100, or may even be incorporated as part of an integrated chip that includes the system 100 (e.g., a SoC). It is understood that the above are merely a few illustrative examples to which the disclosed subject matter is not limited.

In the illustrated embodiment, the system memory 104 may be configured to store pieces of data or information. These pieces of data may include instructions that cause a processor 102 to perform various operations. In general, the system memory 104 may be part of a larger memory hierarchy that includes a number of caches. In various embodiments, the operations described herein may be performed by another layer or tier of that memory hierarchy (e.g., a level 2 (L2) cache). It is understood by one skilled in the art that the while the operations described in reference to the system memory 104 that the disclosed subject matter is not limited to this illustrative example.

In the illustrated embodiment, the system 100 also includes the processor 102. The processor 102 may be configured to perform a plurality of operations as dictated by various instructions. These instructions may be executed by various executions units (mostly not shown), such as, arithmetic logic units (ALUs), floating point units (FPUs), load/store units (LSUs), an instruction fetch unit 116 (IFU), and so on. It is understood that a unit is simply a collection of electrical circuits grouped together to perform a portion of the processor 102's functions. Typically, a unit performs one or more operations in the processor 102's pipelined architecture.

In the illustrated embodiment, the processor 102 may include a branch prediction unit (BPU) or circuit 112. As described above, as the processor 102 is executing a stream of instructions, one (or more) of the instructions may be a branch instruction. A branch instruction is one that causes the stream of instructions to branch or fork between one of two or more paths. The typical example of a branching instruction is an if-then structure, in which if a certain condition is met (e.g., the user clicks an "OK" button) then a first set of instructions will be performed, and if the certain condition is not met (e.g., the user clicks a "Cancel" button) then a second set of instructions will be performed. As described above, this is a problem in pipelined processor architectures because new instructions must enter the processor 102's pipeline before the result of the branch, jump, or if-then structure are known (as the pipeline stage in which the branch instruction is resolved is deep in the pipeline). Therefore, new instructions must be prevented from entering the pipeline until the branch instruction is resolved (thus negating the main advantage of a pipelined architecture) or the processor 102 must make a guess as to which way the stream of instructions will branch and speculatively put those instructions in the pipeline. The BPU 112 may be configured to predict how the stream of instructions will branch. In the illustrated embodiment, BPU 112 may be configured to output a predicted instruction or, more accurately, output a memory address where the predicted instruction is stored.

In the illustrated embodiment, the processor 102 includes a branch prediction address queue (BPAQ) 114. The BPAQ 114 may include a memory structure configured to store a plurality of addresses for predicted instructions that have been predicted by the BPU 112. The BPAQ 114 may store the addresses of these predicted instructions in a first-in-first-out (FIFO) order such that instruction addresses are output from the BPAQ 114 in the same order in which the BPU 112 predicted them.

In the illustrated embodiment, the processor 102 includes an instruction fetch unit (IFU) 116 configured to fetch instructions from the memory hierarchy and place them in the processor 102's pipeline. In such an embodiment, the IFU 116 may be configured to take the memory address associated with the least recent or oldest instruction (the next instruction) from the BPAQ 114, and request the actual instruction from the memory hierarchy. Ideally the instruction will quickly be provided from the memory hierarchy and placed into the processor 102's pipeline.

Ideally the instruction may be fetched from the level 1 (L1) instruction cache 118 (via the memory access(es)). In such an embodiment, as a top or higher tier of the memory hierarchy the L1 instruction cache 118 may be relatively quick and incur little or no delays in the pipeline. However, occasionally the L1 instruction cache 118 may not include the desired instruction. This will result in a cache miss, and the instruction will have to be fetched or loaded from a lower, slower tier of the memory hierarchy (e.g., system memory 104). Such a cache miss may cause a delay in the processor 102's pipeline as instructions will not be input into the pipeline at a rate of one per cycle (or whatever the maximum rate in the processor's architecture).

In the illustrated embodiment, the processor 102 includes an instruction pre-fetcher unit (IPFU) 120. The IPFU 120 is configured to pre-fetch instructions into the L1 instruction cache 118 before the IFU 116 performs the actual fetching operation. Thus, the IPFU 120 reduces the occurrences of any cache misses experienced by the IFU 116. The IPFU 120 may do this by requesting predicted instructions from the L1 instruction cache 118 before the IFU 116 does. In such an embodiment, if a cache miss then occurs, the L1 instruction cache 118 will begin the process of requesting the missed instruction from the system memory 104. In such an embodiment, the instruction may be received and stored in the L1 instruction cache 118 by the time the IFU 116 requests it.

Returning to the BPU 112, the processor 102 may include a branch target buffer (BTB) circuit 122. In various embodiments, the BTB 122 may include a memory that maps a branch address to a previously predicted target address (where the branch will jump to). In such an embodiment, the BTB 122 may indicate which address a previous iteration of the branch instruction jumped to last time or is predicted to jump to. This makes the BPU 112's job simpler and quicker, as the BPU 112 may simply request the predicted branch target address from the BTB 122 instead of performing a full address prediction calculation.

Likewise, the processor 102 may include a return address stack (RAS) circuit 124. In various embodiments, the RAS 124 may be a memory or data structure that stores memory addresses to return to once the current branch operation or instruction (typically a return instruction) has completed. For example, when a branch is a subroutine call, the subroutine will return to the next instruction after the calling memory address once it is completed. In various embodiments, an RAS compute circuit 126 may perform this return address computation.

Figure 2:
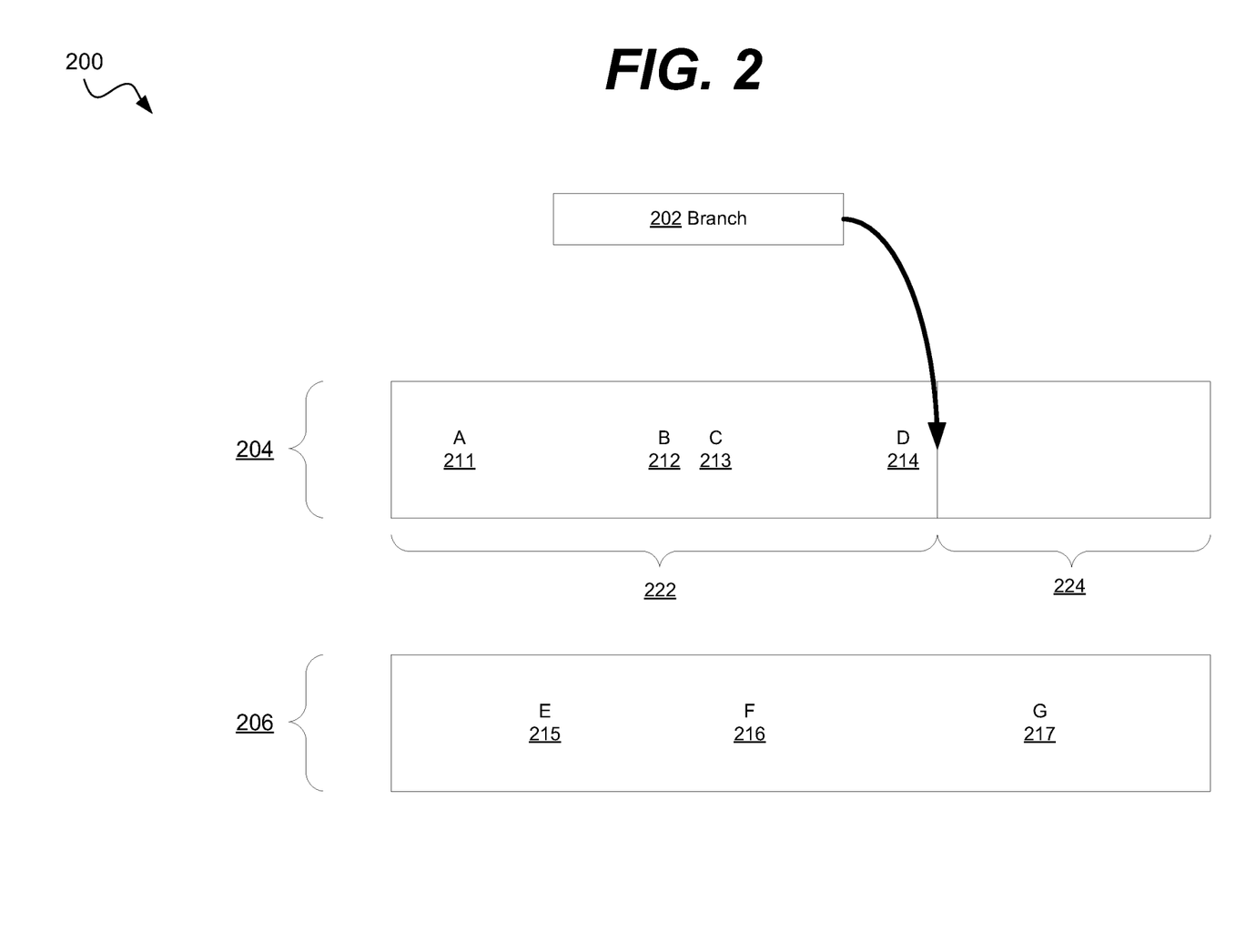
FIG. 2 is a block diagram of example embodiment of a system in accordance with the disclosed subject matter.

Now that the basic structure of the processor 102 is shown, FIG. 2 illustrates an operation performed by the processor 102.

FIG. 2 is a block diagram of example embodiments of a data structure 200 in accordance with the disclosed subject matter. In various embodiments, the data structure 200 may represent memory storage of various instructions to be fetched and processed by the processor 102 of FIG. 1.

In this context, the generic term for a block or portion of memory is "memory segment". For the sake of example, a memory segment may include a cacheline, however large that cacheline is in a particular embodiment. In this context, a cacheline (also spelled cache line or cache-line) may be the unit of data transfer between the cache 118 and main memory 104. In various embodiments, the disclosed subject matter may involve memory segments of multiple cachelines, portions of a cacheline, or memory sizes not measured in cachelines at all. It is understood that the above is merely one illustrative example to which the disclosed subject matter is not limited.

In the illustrated embodiment, the data structure includes cachelines 204 and 206 which occur sequentially. In such an embodiment, the processor 102, as described above, fetches and processes instructions, generally, from the start (e.g., left hand side) of the cachelines 204 & 206 to the end (e.g., right hand side) of the cachelines 204 & 206.

Included in the cachelines are branch instructions A 211, B 212, C 213, D214, E 215, F 216, and G 217. In various embodiments, the BPU 112 of FIG. 1 may be configured to process each branch instruction (which for the sake of simplicity will be assumed to be subroutine calls), and when a branch returns to that point continue processing the cacheline in order.

The BPU 112 may be configured to stop processing (for that clock cycle(s)) at a memory segment of cacheline boundary. For example, while processing cacheline 204 the BPU 112 may process A 211 a $1^{st}$ cycle, then B 212 a $2^{nd}$ cycle, then C 213 a $3^{rd}$ cycle and then D 214 a fourth cycle, and then examine portion 224 a $5^{th}$ cycle, stopping at the end of the cacheline 204 before moving on to cacheline 206's E 215 the $6^{th}$ cycle.

As there are no branches to process in portion 224 (as opposed to portion 222) the time spent examining that cacheline is a wasted cycle (or however many cycles it takes to process that portion 224). In various embodiments, the portion 224 may include a full cacheline. The disclosed subject matter may eliminate or reduce such a branch pipeline bubble (or lack of operation during one or more cycles).

In the disclosed subject matter, the BTB 122 and/or the RAS 124 may include an indication of whether the portion 224, or more generally the portion after any given branch instruction target, is empty or devoid of branch instructions. In such an embodiment, "empty" does not mean that no instructions are stored there, only that no branch instructions are stored in the memory segment. It is expected (but not required) that many non-branching instructions would fill that portion 224.

For example, the return branch 202 (a return from the call D 214) may return the program counter (PC) to the end of portion 222. Upon this return, the BPU 112 may check the RAS 124 and determine that there are no more branch instructions after D 214 (portion 224). The BPU 112 may then start processing the next cacheline 206; thus, saving the wasted compute time involved in examining portion 224 for branches.

Similarly, the BTB 122 may include a flag that indicates if the memory segment after the branch's target address is empty of additional branch instructions. In such an embodiment, if the branch 202 was not a return (from a call) but another type of branch instruction (e.g., call, unconditional jump, jump, etc.) the BTB 122 may include both the target address (e.g., the address of the start of portion 224) and whether or not the portion from the target address to the end of the cacheline (i.e., portion 224) is devoid of additional branch instructions.

Figure 3:
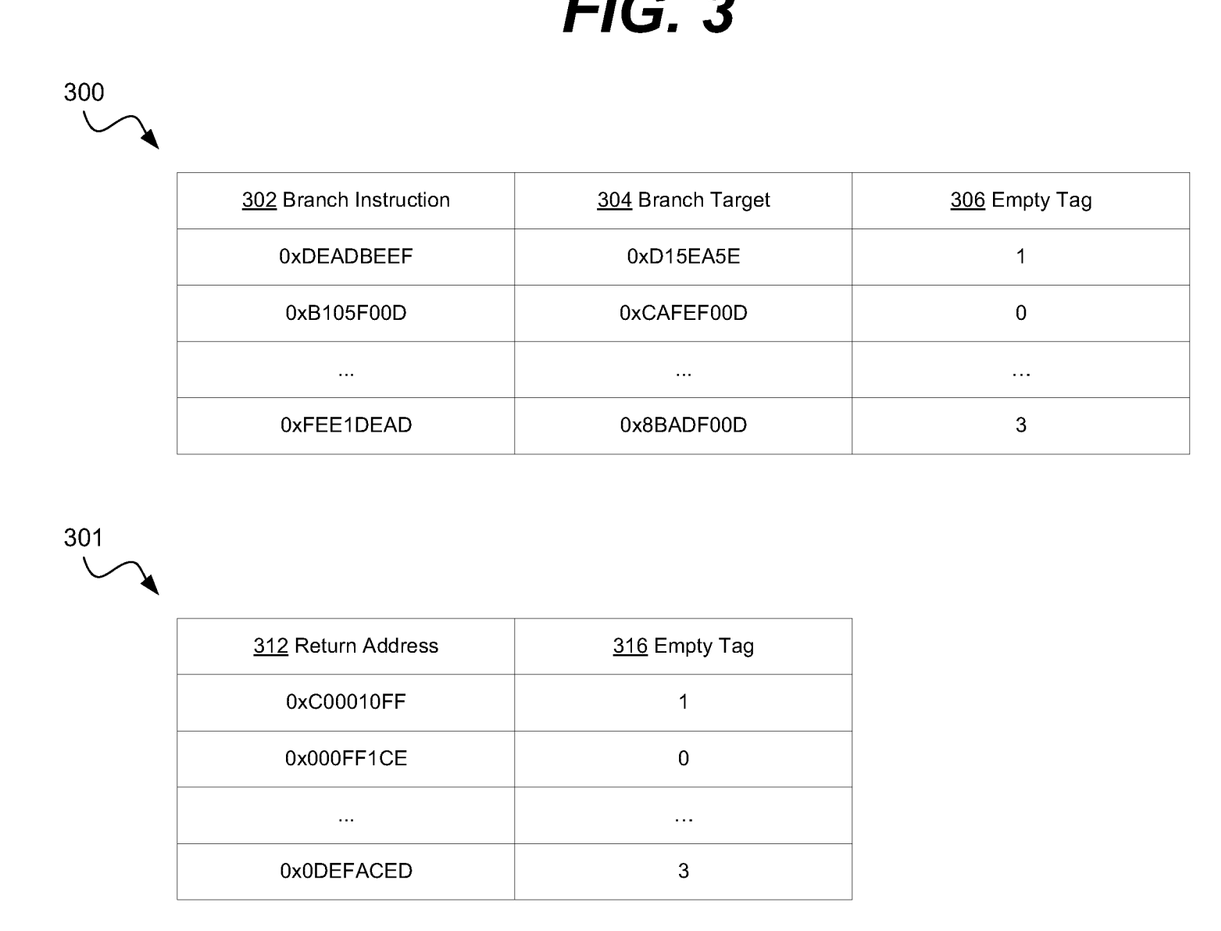
FIG. 3 is a block diagram of example embodiments of data structures in accordance with the disclosed subject matter.

FIG. 3 is a block diagram of example embodiments of data structures 300 and 301 in accordance with the disclosed subject matter. In such an embodiment, the data structure 300 may be stored by a branch target buffer (e.g., BTB 122 of FIG. 1). In various embodiments, the data structure 301 may be stored by a return address stack (e.g., RAS 124 of FIG. 1). It is understood that the above are merely a few illustrative examples to which the disclosed subject matter is not limited.

In the illustrated embodiment, the data structure 300 may show a representative embodiment of the state of a BTB. In such an embodiment, the BTB may include at least three columns or fields (although more may be used in various embodiments). A first field 302 includes the address (or other identifier) of a branch instruction. The second field 304 may include the branch's predicted target address (i.e., where the branch is likely to jump to). In a traditional BTB, aside from a valid flag (not shown)—noting if the row, line or entry may be used—those two columns 302 and 304 may be the only columns or fields.

In such an embodiment, when the BPU encounters a branch instruction, it is looked up via its memory address (field 302), and the BPU determines where in memory the next instruction is to be found (via field 304). As described above, in such an embodiment, upon reaching that target address, the BPU may waste one or more cycles looking for a branch instruction in a memory address that is not there (i.e., the memory segment past the target address is empty or devoid of branch instructions).

However, in the illustrated embodiment, the BPU may be configured to examine the third field or empty flag 306. In such an embodiment, the empty flag 306 may indicate if the memory segment past the target address is empty or devoid of branch instructions. In various embodiments, the empty tag 306 value may be computed the first time the branch instruction is encountered. In some embodiments, this may be done during the commit phase or pipeline stage, when the branch's correctness (or lack thereof) has been fully resolved.

In various embodiments, the empty tag or memory segment empty tag 306 may include a single bit or a true/false value. In such an embodiment, the flag 306 may just refer to the immediate memory segment that includes the target address. In another embodiment, the flag 306 may indicate how many memory segments should be skipped. For example, the last row of data structure 300 has a value of 3, indicating that the current memory segment plus two others are devoid of branch instructions.

In another embodiment, the empty tag 306 may include a valid flag. In another embodiment, the empty tag valid flag may be stored as a separate field (not shown). In such an embodiment, the empty tag valid flag may indicate if the empty tag 306 has been computed and may be relied upon. For example, an entry may be placed in the BTB during the instruction fetch pipeline stage, but the empty flag 306 may not be computed until the commit stage. Or, in another example, the empty flag 306 may only be valid of branches that are predicted to be "taken" and not for branches which are predicted to be "not taken" (or vice versa). In yet another embodiment, the empty flag 306 may be valid only for certain types of branches (e.g., calls and returns). It is understood that the above are merely a few illustrative examples to which the disclosed subject matter is not limited.

In such an embodiment, the empty tag 306 may be increased by 1-bit. In such an embodiment, a valid and true (or set) empty flag might be "0x11", and a valid but false (or cleared) empty flag might be "0x10", where the first bit is the valid bit and the second is the empty status. It is understood that the above is merely one illustrative example to which the disclosed subject matter is not limited.

In the illustrated embodiment, the data structure 301 may show a representative embodiment of the state of a RAS. In such an embodiment, the RAS may include at least two columns or fields (although more may be used in various embodiments). A first field 312 includes the return address (or other identifier) to which a call branch instruction will return. In a traditional RAS, aside from a valid flag (not shown)—noting if the row, line or entry may be used—the two column 312 may be the only column or field. Traditionally, return addresses are pushed on to the top of the stack 301 and then popped off the top in a last-in-first-out (LIFO) manner.

In the illustrated embodiment, the BPU may be configured to examine the second field or empty flag 316. In such an embodiment, the empty flag 316 may indicate if the memory segment past the target address of the return instruction (field 312) is empty or devoid of branch instructions, as described above. In various embodiments, the empty tag 316 value may be computed the first time the call branch instruction is encountered. In various embodiments, the empty flag 316 may be similar to that described above. In various embodiments, the BTB's empty flag 306 and the RAS's empty flag 316 may include differences in format or information.

Figure 4:
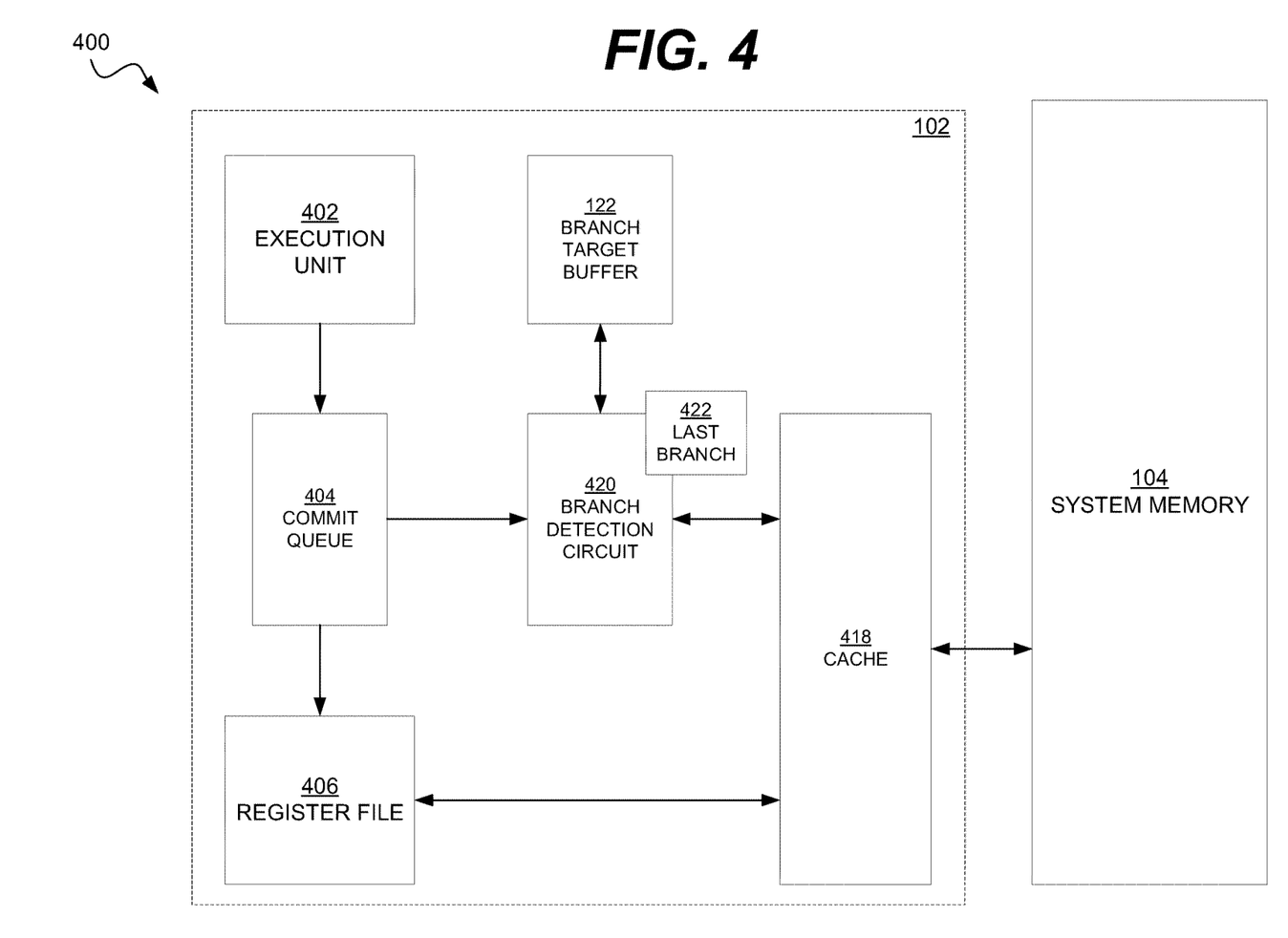
FIG. 4 is a block diagram of an example embodiment of a system in accordance with the disclosed subject matter.

FIG. 4 is a block diagram of an example embodiment of a system 400 in accordance with the disclosed subject matter. In various embodiments, the system 100 may include a computer, a number of discrete integrated circuits, or a system-on-a-chip (SoC). As described below, the system 100 may include a number of other components that are not illustrated in this figure in order to not obscure the disclosed subject matter.

In the illustrated embodiment, the system 400 includes a system or main memory 104. In various embodiments, the system memory 104 may be made up of dynamic random access memory (DRAM). Although, it is understood that the above is merely one illustrative example to which the disclosed subject matter is not limited. In such an embodiment, the system memory 104 may include memory on modules (e.g., dual in-line memory modules (DIMMs)), may be integrated chips that are soldered or otherwise fixedly integrated with the system 400, or may even be incorporated as part of an integrated chip that includes the system 400 (e.g., a SoC). It is understood that the above are merely a few illustrative examples to which the disclosed subject matter is not limited.

In the illustrated embodiment, the system memory 104 may be configured to store pieces of data or information. These pieces of data may include instructions that cause a processor 102 to perform various operations. In general, the system memory 104 may be part of a larger memory hierarchy that includes a number of caches. In various embodiments, the operations described herein may be performed by another layer or tier of that memory hierarchy (e.g., a level 2 (L2) cache). It is understood by one skilled in the art that the while the operations described in reference to the system memory 104 that the disclosed subject matter is not limited to this illustrative example.

In the illustrated embodiment, the system 100 also includes the processor 102. The processor 102 may be configured to perform a plurality of operations as dictated by various instructions. These instructions may be executed by various executions units (mostly not shown), such as, arithmetic logic units (ALUs), floating point units (FPUs), load/store units (LSUs), an instruction fetch unit 116 (IFU), and so on. It is understood that a unit is simply a collection of electrical circuits grouped together to perform a portion of the processor 102's functions. Typically, a unit performs one or more operations in the processor 102's pipelined architecture.

In various embodiments, the processor 102 may operate in various pipeline stages. In computing, a pipeline, also known as a data pipeline, is a set of data processing elements connected in rough series, where the output of one element is the input of the next one. The elements of a pipeline are often executed in parallel or in time-sliced fashion. Some amount of buffer storage is often inserted between elements.

In the classic reduced instruction set computer (RISC) pipeline the stages include: instruction fetch (mostly shown in FIG. 1), instruction decode, execute, memory access, and writeback. In modern out-of-order and speculative execution processors, the processor 102 may execute instructions that are not wanted. The pipeline stage in which it is determined if an instruction (or its results) are wanted is known as the commit stage. If one were to place the commit stage into the Procrustean beds of the classic RISC pipeline one would likely place it into the writeback stage. In various embodiments or architectures, the commit stage may be a separate pipeline stage.

In the illustrated embodiment, the processor 102 may include an execution unit 402, as described above. In the illustrated embodiment, the processor 102 may include a commit queue 404, in which completed instructions are placed, in age order.

In the illustrated embodiment, the processor 102 may include a register file or memory 406. In such an embodiment, as instructions are committed (as opposed to discarded) the results of those instructions may be placed or committed into the register file 406. In modern computers with register renaming, the committal action may include validating or marking as correct a value already stored in a register 406. In various embodiments, the processor may include a cache 418 (e.g., a data cache) where the register file's data is ultimately moved and then the system memory 104, as described above.

Further, in the illustrated embodiment, the processor 102 may include a branch detection circuit 420. In such an embodiment, the branch detection circuit 420 may be configured to detect, during a commit stage of a current instruction, an existence or at least one branch instruction stored with a portion of a memory segment (e.g., cacheline).

In such an embodiment, once the branch detection circuit 420 has made a determination as to whether or not the memory segment portion is devoid or empty of any branch instructions, it may create or update a memory segment empty tag in the BTB 122, as described above. In various embodiments, this may include setting or clearing the empty tag associated with the branch instruction.

In some embodiments, the processor 102 or the branch detection circuit 420 may include a memory 422 that stores the last or current branch instruction encountered from the commit queue 404. In such an embodiment, this last branch memory or circuit 422 may indicate the branch instruction for which the currently computed empty tag is associated. In various embodiments, this last branch memory 422 may be valid (an active branch empty tag is being computed) or invalid (no branch empty tag is actively being computed).

In various embodiments, the BTB 122 may be graph based. In such an embodiment, branches may be stored as nodes and edges may represent control flow of the program or set of instructions. In various embodiments, the disclosed subject matter may be limited to a first level BTB of a multi-level or hierarchical BTB structure. It is understood that the above is merely one illustrative example to which the disclosed subject matter is not limited.

In various embodiments, certain designs define a block of instructions and a sequence of instructions ending in a branch. In such an embodiment, the BTB 122 may look up or index branches based upon a block's starting address and not the actual address of the branch instruction. In such an embodiment, the disclosed subject matter be modified accordingly. Further, the BTB metadata could be enhanced to store how many empty cachelines or memory segments may be skipped before the next branch instruction is encountered. It is understood that the above are merely a few illustrative examples to which the disclosed subject matter is not limited.

In various embodiments, a branch target buffer (BTB) may be configured to store metadata associated with branch instructions, e.g., an empty flag. A branch prediction pipeline (BPP) may be configured to detect branch instructions whose target cachelines are partially or completely empty and skip branch prediction for any empty target cachelines. In various embodiments, the BPP may do this by using committing instruction cachelines to train upon. The BPP may mark taken branch instructions whose target cachelines are empty by setting at least one of a taken target cacheline empty flag. The BPP may mark not taken branch instructions with a not-taken target cacheline empty flag as true in the BTB entries of the branch instructions. The BPP may check a BTB entry of the branch instruction or a return address stack (RAS) to determine whether the target cacheline empty flag is set. If the target cacheline empty flag is set, the BPP may skip branch prediction for one or more instruction cachelines including a target cacheline of the branch instruction.

Figure 5:
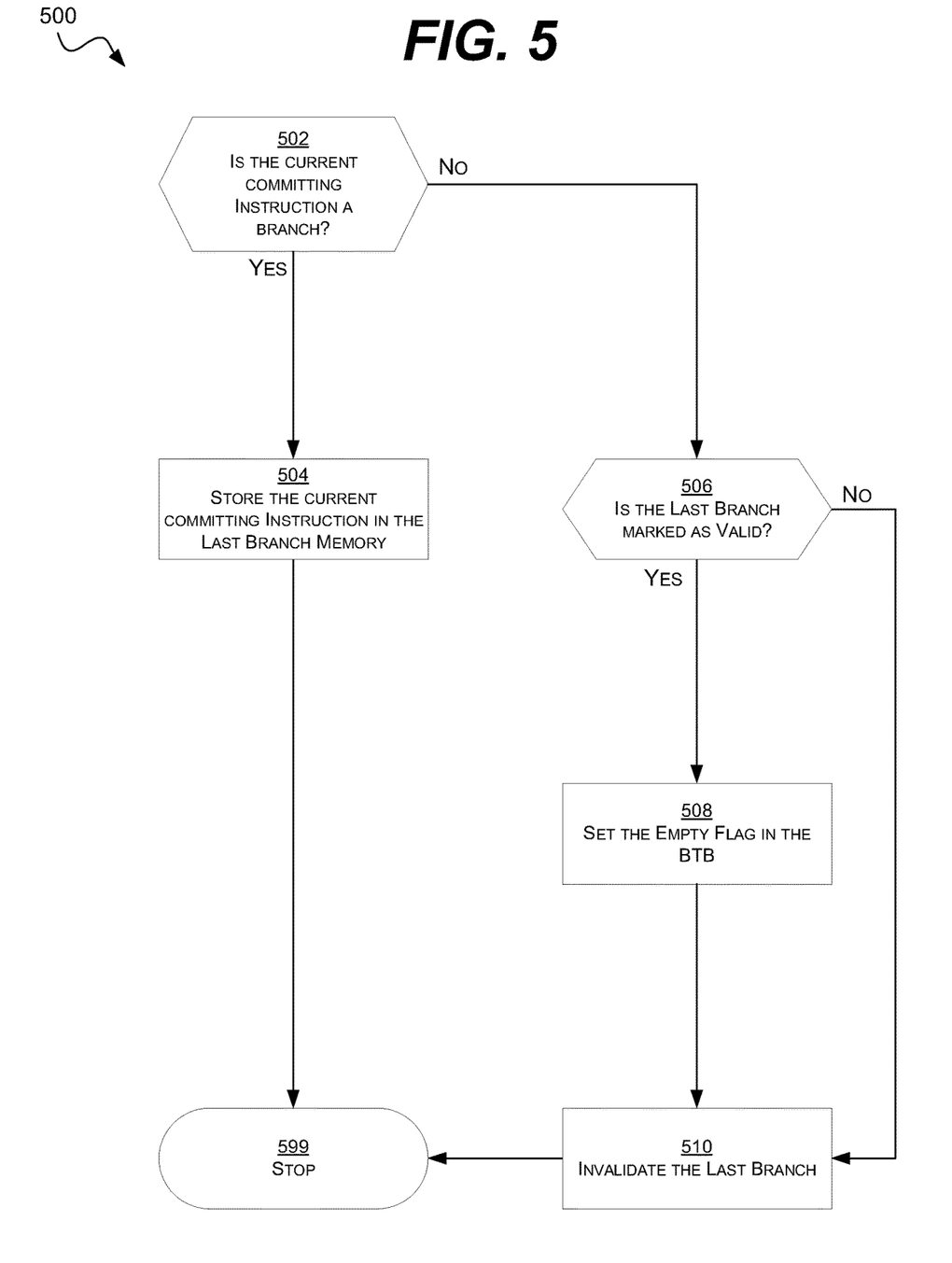
FIG. 5 is a flowchart of an example embodiment of a technique in accordance with the disclosed subject matter.

FIG. 5 is a flowchart of an example embodiment of a technique in accordance with the disclosed subject matter. In various embodiments, the technique 500 may be used or produced by the systems such as those of FIG. 4 or 7. Although, it is understood that the above are merely a few illustrative examples to which the disclosed subject matter is not limited. It is understood that the disclosed subject matter is not limited to the ordering of or number of actions illustrated by technique 500.

In various embodiments, the technique 500 may illustrate an embodiment of a technique employed by the processor or branch detection unit to determine the proper state of a memory segment empty flag, as described above. In the illustrated embodiment, a technique 500 that may be employed exclusively for taken branches is shown. In another embodiment, a technique may be employed for not-taken branches. In yet another embodiment, a technique may be employed for both taken and not-taken branches, and/or various types of branch instructions (e.g., call, return, unconditional jump, condition jump, jump-on-zero or other value, etc.). It is understood that the above is merely one illustrative example to which the disclosed subject matter is not limited.

Block 502 illustrates that, in one embodiment, a committing instruction may be checked to determine if it is a branch instruction or not. As described above, the committing instruction may be provided by or stored in a commit queue that houses branch instructions or non-branch instructions, in order of age. In such an embodiment, the non-branch instructions may be grouped by the memory segment they are from.

Block 504 illustrates that, in one embodiment, if the committing instruction is a branch instruction, the branch instruction (or its address) may be stored in the last branch memory, as described above. In various embodiments, the last branch memory may be marked as valid or as storing an address that is being used for the empty tag determination.

Block 506 illustrates that, in one embodiment, if the committing instruction is not a branch instruction, a check may be made to determine if the last branch memory is valid or active.

Block 508 illustrates that, in one embodiment, if the committing instruction is not a branch and the last branch memory value is valid, the empty flag associated with the branch stored in the last branch memory may be set to a value that indicates that the rest of the memory segment includes no branch instructions. As described above, the empty flag may be stored in a BTB.

Block 510 illustrates that, in one embodiment, if the committing instruction is not a branch, the last branch memory value may be invalidated or marked as inactive. In various embodiments, this Block 510 may be skipped if the results of Block 506 indicate that the last branch memory value is already invalid.

Block 599 illustrates a stop point. Although, it is understood that the technique 500 may be repeated for each committing instruction.

Figure 6:
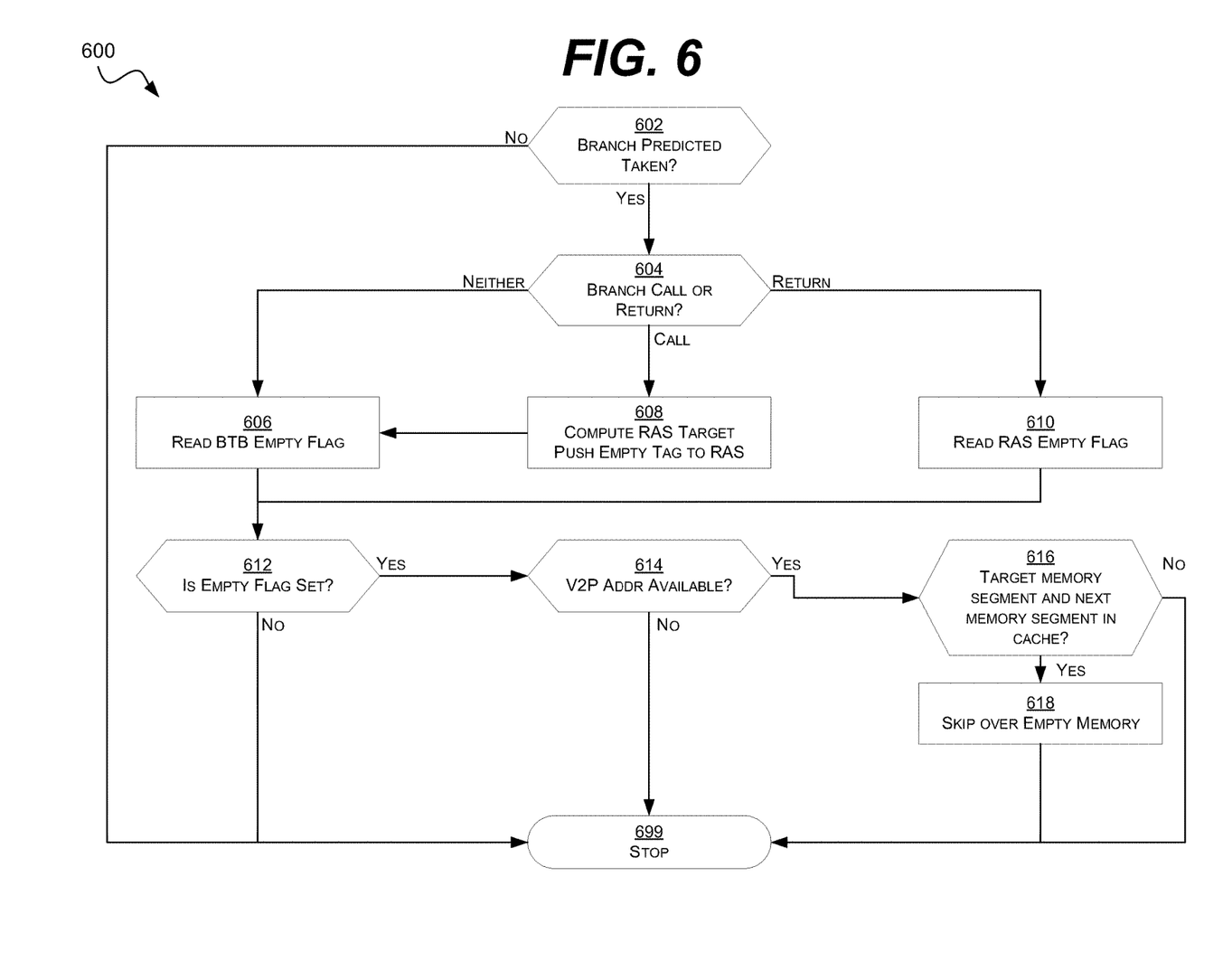
FIG. 6 is a flowchart of an example embodiment of a technique in accordance with the disclosed subject matter.

FIG. 6 is a flowchart of an example embodiment of a technique in accordance with the disclosed subject matter. In various embodiments, the technique 600 may be used or produced by the systems such as those of FIG. 1 or 7. Although, it is understood that the above are merely a few illustrative examples to which the disclosed subject matter is not limited. It is understood that the disclosed subject matter is not limited to the ordering of or number of actions illustrated by technique 600.

In various embodiments, the technique 600 may illustrate an embodiment of a technique employed by the processor or branch prediction unit to determine whether to skip over or past a portion of a memory segment or cacheline, as described above. In the illustrated embodiment, a technique 600 may be employed exclusively for taken branches is shown. In another embodiment, a technique may be employed for not-taken branches. In yet another embodiment, a technique may be employed for both taken and not-taken branches, and/or various types of branch instructions (e.g., call, return, unconditional jump, condition jump, jump-on-zero or other value, etc.). It is understood that the above is merely one illustrative example to which the disclosed subject matter is not limited.

Block 602 illustrates that, in one embodiment, a determination may be made as to whether or not a branch instruction is predicted as taken. If not, the technique 600 may stop 699. Although, it is understood that the above is merely one illustrative example to which the disclosed subject matter is not limited.

Block 604 illustrates that, in one embodiment, a determination may be made as to what type of branch instruction has been encountered. In the illustrated embodiment, the determination may be whether the branch is a call, return, or neither of those two. It is understood that the above is merely one illustrative example to which the disclosed subject matter is not limited.

Block 606 illustrates that, in one embodiment, if the branch instruction is neither a call or a return, the memory segment empty flag (associated with the branch instruction) may be read from the BTB, as described above.

Block 608 illustrates that, in one embodiment, if the branch instruction is a call branch instruction, the corresponding return branch instruction's target may be determined. Then a determination may be made as to whether the rest of the return's target memory segment or cacheline is empty or devoid of further branch instructions. Once this determination has been made and the memory segment empty flag created, the memory segment empty flag may be pushed onto the RAS along with the return target address, as described above. In such an embodiment, once the RAS's empty flag has been prepared for the call's eventual return, the BPU may perform Block 606 for the call instruction.

Block 610 illustrates that, in one embodiment, if the branch instruction is a return branch instruction, the RAS's empty flag for this branch (prepared via Block 608) may be read, as described above.

Block 612 illustrates that, in one embodiment, the value of the empty flag (either BTB's or RAS's as determined by the branch type) may be determined, as described above. If the empty flag is not set, cleared, or otherwise indicate that the rest of the memory segment is not branch free, the technique 600 may stop 699 and branch processing may occur normally.

Block 614 illustrates that, in one embodiment, a determination may be made as to whether the virtual to physical (V2P) address translation for the cacheline containing the target address and the next sequential cacheline after the target address are ft available. In various embodiments, this may be stored in a translation look-aside buffer (TLB). If the virtual or to physical (V2P) address translation for the cacheline containing the target address and the next sequential cacheline after the target address are and the next memory segment are not available, an indication may be made to move to the next memory segment such that extra work may be done (e.g., TLB fills). The technique 600 may stop at Block 699.

Block 616 illustrates that, in one embodiment, a determination may be made as to whether the target cacheline and the cacheline following the target cacheline are both available in the cache (e.g., instruction cache) and/or the BTB (cache hits not misses). If not, the technique may not skip over the empty memory but instead moves to Block 699.

Block 618 illustrates that, in one embodiment, if the empty flag is set (or indicates that the rest of the target memory segment may be skipped) and the target cacheline and the cacheline following the target cacheline are both available in the cache, the BPU may skip over or past the rest of the current memory segment, as described above.

Block 699 illustrates a stop point. Although, it is understood that the BPU may continue further processing of the branch prediction, as described above, and that technique 600 may be part of a larger branch prediction technique. Further, it is understood that the technique 600 may be repeated for each branch instruction.

Figure 7:
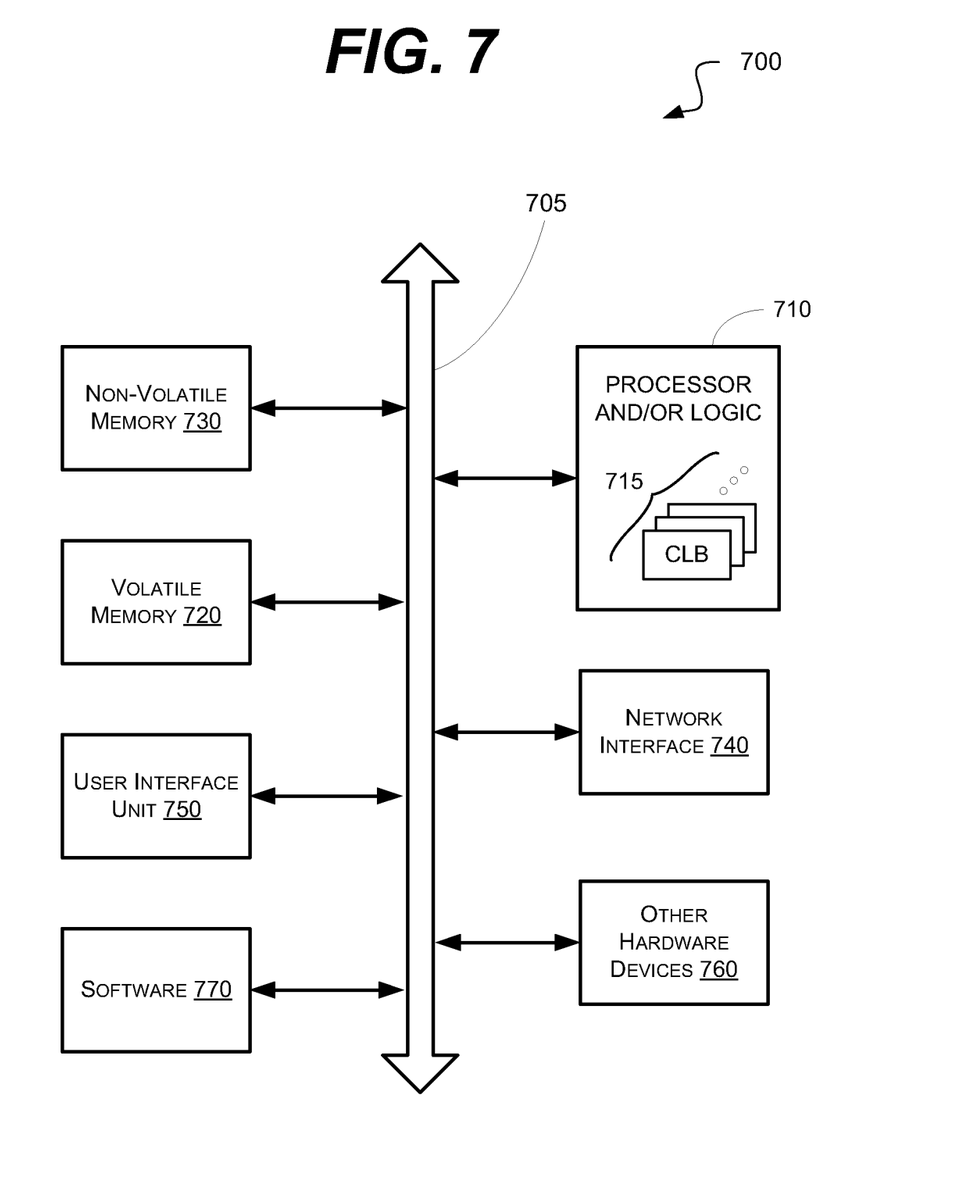
FIG. 7 is a schematic block diagram of an information processing system that may include devices formed according to principles of the disclosed subject matter.

FIG. 7 is a schematic block diagram of an information processing system 700, which may include semiconductor devices formed according to principles of the disclosed subject matter.

Referring to FIG. 7, an information processing system 700 may include one or more of devices constructed according to the principles of the disclosed subject matter. In another embodiment, the information processing system 700 may employ or execute one or more techniques according to the principles of the disclosed subject matter.

In various embodiments, the information processing system 700 may include a computing device, such as, for example, a laptop, desktop, workstation, server, blade server, personal digital assistant, smartphone, tablet, and other appropriate computers or a virtual machine or virtual computing device thereof. In various embodiments, the information processing system 700 may be used by a user (not shown).

The information processing system 700 according to the disclosed subject matter may further include a central processing unit (CPU), logic, or processor 710. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 700 according to the disclosed subject matter may further include a volatile memory 720 (e.g., a Random Access Memory (RAM)). The information processing system 700 according to the disclosed subject matter may further include a non-volatile memory 730 (e.g., a hard drive, an optical memory, a NAND or Flash memory). In some embodiments, either the volatile memory 720, the non-volatile memory 730, or a combination or portions thereof may be referred to as a "storage medium". In various embodiments, the volatile memory 720 and/or the non-volatile memory 730 may be configured to store data in a semi-permanent or substantially permanent form.

In various embodiments, the information processing system 700 may include one or more network interfaces 740 configured to allow the information processing system 700 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 700 according to the disclosed subject matter may further include a user interface unit 750 (e.g., a display adapter, a haptic interface, a human interface device). In various embodiments, this user interface unit 750 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 700 may include one or more other devices or hardware components 760 (e.g., a display or monitor, a keyboard, a mouse, a camera, a fingerprint reader, a video processor). It is understood that the above are merely a few illustrative examples to which the disclosed subject matter is not limited.

The information processing system 700 according to the disclosed subject matter may further include one or more system buses 705. In such an embodiment, the system bus 705 may be configured to communicatively couple the processor 710, the volatile memory 720, the non-volatile memory 730, the network interface 740, the user interface unit 750, and one or more hardware components 760. Data processed by the processor 710 or data inputted from outside of the non-volatile memory 730 may be stored in either the non-volatile memory 730 or the volatile memory 720.

In various embodiments, the information processing system 700 may include or execute one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740) of the information processing system 700. In such an embodiment, the information processing system 700 may include one or more native applications, which may be installed locally (e.g., within the non-volatile memory 730) and configured to be executed directly by the processor 710 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 710.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts is to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
 a branch prediction circuit configured to predict that a branch instruction will be taken; and
 a return address stack circuit configured to store a memory segment empty flag that indicates that a memory segment after a return address does not include at least one other branch instruction;
 determine that a physical address translation for a next memory segment and a following sequential memory segment are available; and
 wherein the branch prediction circuit is configured to skip over the memory segment associated with the memory segment empty flag that indicates a lack of at least one other branch instruction.

2. The apparatus of claim 1, wherein the branch prediction circuit is configured to:
 determine that a next memory segment is stored within an instruction cache and the return address stack circuit; and
 skip over the memory segment that the memory segment empty flag indicates a lack of branch instructions.

3. The apparatus of claim 1, wherein the branch prediction circuit is configured to, for a memory segment that includes at least one other branch instruction after a return address, move to a next instruction within the memory segment.

4. The apparatus of claim 1, wherein the memory segment is a cacheline.

5. The apparatus of claim 1, wherein the branch prediction circuit is configured to determine if the branch instruction is one of a call instruction or a return instruction.

6. The apparatus of claim 5, further comprising a branch target buffer circuit configured to store the memory segment empty flag for a target address; and
 wherein, in response to the branch instruction being a call instruction, the apparatus is configured to:
 determine that the memory segment after an associated return instruction includes at least one other branch instruction, and
 store a result of the determination as a memory segment empty flag within the return address stack circuit.

7. The apparatus of claim 5, wherein branch target buffer circuit is further configured to store a second memory segment empty flag that indicates or not that the memory segment after a target return address does not include at least one other branch instruction, wherein the memory segment empty flag was created during a commit stage of a prior occurrence of the branch instruction.

8. The apparatus of claim 1, wherein the branch prediction circuit is configured to:
 proceed to skip over the memory segment that the memory segment empty flag indicates a lack of branch instructions.

9. The apparatus of claim 1, wherein the branch detection circuit is configured to, in response to the current instruction not being a branch instruction, determine that a previously stored last committed branch instruction is still valid.

10. The apparatus of claim 9, further comprising
a branch target buffer circuit configured to store:
   a branch instruction address, and
   a memory segment empty flag that indicates whether a portion of the memory segment after a target address includes at least one branch instruction; and
wherein the branch detection circuit is configured to, in response to the current instruction not being a branch instruction and the previously stored last committed branch instruction being still valid, set, in the branch target buffer circuit, a memory segment empty flag associated with the previously stored last committed branch instruction.

11. The apparatus of claim 9, wherein the branch detection circuit is configured to, if the current instruction is not a branch instruction and the previously stored last committed branch instruction is not valid, mark the previously stored last committed branch instruction as not valid.

12. The apparatus of claim 1, wherein the branch target buffer includes a graph-based branch target buffer circuit.

13. The apparatus of claim 1, wherein the memory segment empty flag that indicates a number of memory segments, or portions thereof, after the branch instruction address that do not include at least one other branch instruction.

14. An apparatus comprising:
a branch detection circuit configured to detect, during a commit stage of a current instruction, wherein the commit stage includes a pipeline stage in which the apparatus determines that an instruction and the instruction's results will be kept, an existence of at least one branch instruction stored within a portion of a memory segment; and
a return address circuit configured to store:
   a return address, and
   a memory segment empty flag that indicates whether a portion of the memory segment after a return address includes at least one branch instruction.

15. The apparatus of claim 14, wherein the memory segment is a cacheline.

16. The apparatus of claim 14, wherein the apparatus comprises a commit queue circuit;
wherein the commit queue circuit is configured to store currently committing instructions in age order.

17. The apparatus of claim 14, wherein the apparatus comprises a last committed branch memory configured to store a previously committed branch instruction.

18. The apparatus of claim 17, wherein branch detection circuit is configured to:
determine that the current instruction is a branch instruction; and
store the current instruction in the last committed branch memory.

19. A system comprising:
a branch detection circuit configured to detect, during a commit stage of a current committing instruction, wherein the commit stage includes a pipeline stage in which the system determines that an instruction and the instruction's results will be kept, an existence or at least one branch instruction stored with a portion of a memory segment;
a branch target buffer circuit configured to store:
   a branch instruction address, and
   a memory segment empty flag that indicates whether a portion of the memory segment after a target address includes at least one other branch instruction; and
a branch prediction circuit configured to predict that a branch instruction will be taken, and wherein the branch prediction circuit is configured to skip over the memory segment that an associated memory segment empty flag indicates a lack of branch instructions.

20. The system of claim 19, wherein the memory segment empty flag is only valid for taken branch instructions.

* * * * *